(12) United States Patent
Nagase et al.

(10) Patent No.: US 6,579,640 B1
(45) Date of Patent: Jun. 17, 2003

(54) SEALED RECTANGULAR BATTERY AND MANUFACTURING METHOD FOR THE SAME

(75) Inventors: Takashi Nagase, Tokushima (JP); Takeo Hamamatsu, Tokushima (JP); Masao Inoue, Tokushima (JP); Hideyuki Asanuma, Tokushima (JP); Naoyoshi Hinotsu, Tokushima (JP)

(73) Assignee: Sanyo Electric Co., Ltd., Osaka (JP)

( * ) Notice: Subject to any disclaimer, the term of this patent is extended or adjusted under 35 U.S.C. 154(b) by 155 days.

(21) Appl. No.: 09/670,193

(22) Filed: Sep. 26, 2000

(30) Foreign Application Priority Data

Sep. 28, 1999 (JP) ............................................. 11-273933
Sep. 28, 1999 (JP) ............................................. 11-273934
Oct. 29, 1999 (JP) ............................................. 11-310084

(51) Int. Cl.⁷ .............................. H01M 2/00; H01M 2/12
(52) U.S. Cl. ............................ 429/54; 429/53; 429/55; 429/178; 429/211
(58) Field of Search .............................. 429/54, 53, 55, 429/178, 211

(56) References Cited

U.S. PATENT DOCUMENTS 4,529,673 A * 7/1985 Zupancic .................. 429/43 X

FOREIGN PATENT DOCUMENTS

| EP | 0125037 | 11/1984 |
|---|---|---|
| JP | 07183012 | 7/1995 |
| JP | 8153496 | 6/1996 |
| WO | WO 9856052 | 12/1998 |

* cited by examiner

Primary Examiner—John S. Maples
(74) Attorney, Agent, or Firm—Armstrong, Westerman & Hattori, LLP (57) ABSTRACT

A sealed rectangular battery has a conductive battery case including an external casing and a sealing cap. The external casing encloses a generator element and is sealed by attaching the sealing cap using heat. The battery includes an electrode terminal with an opposite polarity to the battery case, and a safety valve. The safety valve includes a cap that is charged with the same polarity as the battery case and a valving element that covers a vent hole. The electrode terminal and safety valve are provided separately at different positions on the battery case. This construction is simpler than conventional batteries where the safety valve is integrally formed with an electrode terminal, which means that the electrode terminal can be miniaturized. This battery also has improved internal resistance.

14 Claims, 9 Drawing Sheets

SEALED RECTANGULAR BATTERY AND MANUFACTURING METHOD FOR THE SAME

This application is based on applications Nos. H11-273933, H11-273934, and H11-310084 filed in Japan, the contents of which are hereby incorporated by reference.

BACKGROUND OF THE INVENTION (1) Field of the Invention

The present invention relates to a sealed rectangular battery and a manufacturing method for the same. In particular, the invention relates to an improvement in the construction of the sealing cap and terminals.

(2) Related Art

A rapid increase in the use of small electronic appliances has been observed in recent years. Such appliances include mobile phones and personal digital assistants (PDAs), and need to be capable of relatively long periods of continuous operation. As a result, much research is being conducted into the development of batteries with high energy densities that can be used to power these appliances.

Small electronic appliances tend to be powered by sealed rectangular batteries. Compared to other batteries, rectangular batteries have the advantage of taking up little space. This makes it easy to enclose the battery within the internal space of a portable electronic appliance.

Figure 8:
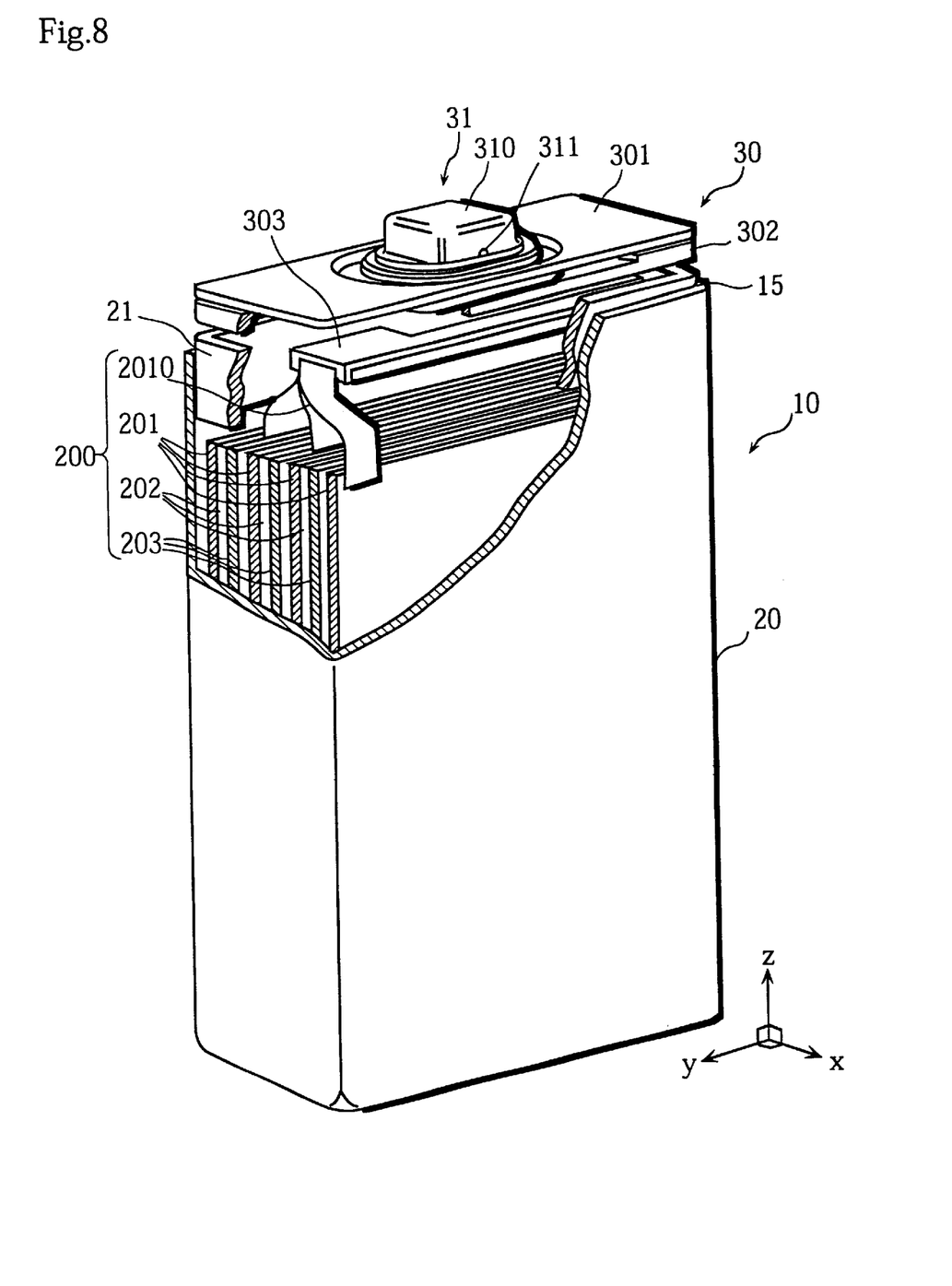
FIG. 8 shows a partial cross-section of the construction of a sealed rectangular battery in the related art.

FIG. 8 shows a partial cross-section of the construction of a rectangular nickel-hydroxide battery as one example of a sealed rectangular battery. This nickel-hydroxide battery 10 is mainly composed of an external casing 20, a generator element 200, and a sealing cap 30. In this example, the nickel-hydroxide battery 10 is 35.5 mm high, 17.0 mm wide, and 6.1 mm thick.

The external casing 20 and sealing cap 30 are both press-formed from nickel-plated sheet steel. This means that the nickel-hydroxide battery 10 is enclosed by a metal casing. An electrode terminal 31 (the positive electrode in the illustrated example) is provided on the sealing cap 30, and is square-shaped with sides that are approximately 3.5 mm long. On the inside of the battery, a cylindrical member 313 (see FIG. 9B) is caulked to the positive electrode terminal 31 via the gasket 312. This part forms an airtight seal between the positive electrode terminal 31 and the sealing cap 30. The caulking referred to here is the process of partly deforming metallic members to fix them to one another.

The generator element 200 is composed of positive electrode plates 201, separators 202 and negative electrode plates 203 that are arranged in layers as shown in FIG. 8. This generator element 200 is impregnated with electrolyte and enclosed within the external casing 20. The negative electrode plates 203 are produced by forming a coat of a hydrogen-absorbing alloy (as an active material) on the surface of punching metal made of nickel-plated sheet steel. Conversely, the positive electrode plates 201 are produced by forming a coat of an active material, which has nickel hydroxide as its main constituent, on a surface of punching metal also made of nickel-plated sheet steel.

The positive electrode plates 201 are connected to the electrode terminal 31 via the tabs 2010 and the positive electrode collector 303.

The sealing cap 30 is arranged into an opening 15 of the external casing 20 so that an insulating plate 302 faces a spacer 21. Laser welding is then performed around the edges of the opening 15 and the sealing cap 30 to seal the inner space of the external casing 20.

Figure 9A:
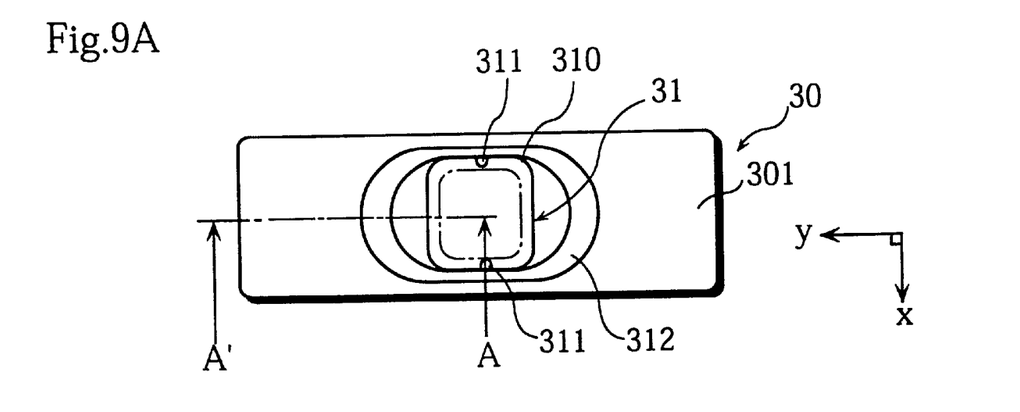
FIGS. 9A to 9C show the construction of a conventional sealing cap, with FIG. 9A showing the sealing cap from above, FIG. 9B showing a partial cross-section, and FIG. 9C showing the sealing cap from below.
Figure 9B:
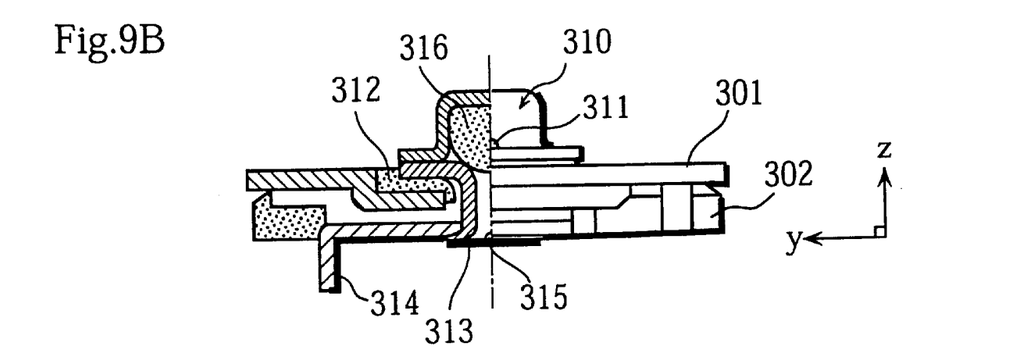
Figure 9C:
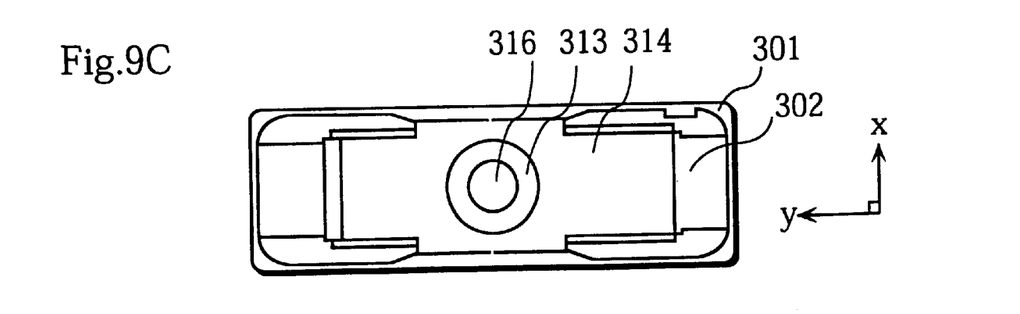

FIGS. 9A to 9C show the sealing cap 30 in more detail. FIG. 9A shows the sealing cap 30 from above. FIG. 9B shows a partial cross-section of the sealing cap 30 taken along the line A–A' shown in FIG. 9A. FIG. 9C shows the sealing cap 30 from below. As shown in FIG. 9B, a valving element 316 formed of elastic rubber is enclosed in the terminal cap 310. This valving element 316 normally presses against the periphery of the vent hole 315 to seal the battery airtight. However, when the pressure inside the battery rises to a predetermined value or above, the gas pressure inside the battery forces the valving element 316 upward so that gas that has accumulated within the battery can escape through the air outlets 311. As the gas escapes, the pressure inside the battery falls, so that the valving element 316 returns to its original position.

In addition to improvements in energy density, there are demands for miniaturization of sealed rectangular batteries (in particular for the development of slimmer batteries) and for reductions in internal resistance. Much research is currently being conducted towards these aims.

When developing a rectangular nickel-hydroxide battery, the construction of the positive electrode terminal with its comparatively large number of components places limitations on how slim the battery can be made. Such conventional designs make reductions in the thickness of the battery problematic. There is a further problem in that the complex construction of the positive electrode terminal raises the internal resistance of the battery.

When a battery is made slimmer, little distance is left between the positive electrode terminal and the edges of the sealing cap. These edges of the sealing cap are usually heat-sealed, such as by laser welding, to the edge that surrounds the opening in the external casing. When the resinous parts of the positive electrode terminal, such as the gasket, are located close to the welded parts, there is the risk of the heat generated during the sealing process causing deformation in the resinous parts. If, for example, the area surrounding the cylindrical member 313 of the electrode terminal 31 is exposed to heat, this will lead to deformation of the gasket 312 which can destroy the airtight seal for the battery. In this conventional structure, the electrode terminal 31 is electrically connected to the positive electrode plates 201 by the tab 2010 and the positive electrode collector 303. This makes the construction complex and lengthens the path taken the electrical current, thereby raising the internal resistance of the battery. These problems lead to decreases in battery performance.

As a result, there are demands for slimmer sealed rectangular batteries that do not suffer from decreases in battery performance.

SUMMARY OF THE INVENTION

The present invention has a first object of providing a sealed rectangular battery, and a manufacturing method for the same, that can be made slim without affecting the seal of the battery. The invention has a second object of providing a sealed rectangular battery, and a manufacturing method for the same, with reduced internal resistance.

The first object can be achieved by a sealed rectangular battery that has a battery case formed of an external casing and a sealing cap. The sealing cap encloses a generator element and is sealed by attaching the sealing cap using heat. The battery includes an electrode terminal with an opposite polarity to the battery case, and a safety valve. The safety valve is composed of a cap that covers a vent hole which is connected to an inside of the battery composed of (i) a valving element positioned so as to cover a vent hole that is connected to an inside of the sealed rectangular battery, and (ii) a cap provided so as to house the valving element and to become charged with a same polarity as the battery case. The electrode terminal and the safety valve are separately provided at different positions on the battery case.

With the stated construction, the electrode terminal can be made with a simpler construction than a conventional electrode terminal that is integrally formed with a safety valve. This means that the electrode terminal can be made smaller, so that the sealed rectangular battery can be made slimmer.

Since the electrode terminal can be miniaturized, when the sealing cap is attached to the external casing by the application of heat (such as by laser welding), adverse effects due to heat being conducted to the electrode terminal can be suppressed.

The safety valve can be charged with different polarity to the electrode terminal. When this is the case, the electrode terminal can be used as the positive electrode terminal and the safety valve can be used as the negative electrode terminal, for example.

The positive electrode terminal and the safety valve may be provided on a main surface of the sealing cap. With this construction, a battery pack can be produced just by connecting electrode terminals and safety valves on the sealing caps of sealed rectangular batteries without having to arrange adjacent batteries with opposite orientations. This improves the ease with which battery packs can be produced.

An outward cylindrical projection may also be formed on the outside of the battery case, with the shaft of the positive electrode terminal being threaded through an insulating gasket positioned in this projection.

When a positive electrode terminal is constructed in this way, the gasket is positioned far from the edge of the sealing cap. This avoids the conventional problem of deformation in the gasket due the effects of the heat used when attaching the sealing cap over the opening in the external casing. As a result, a sealed rectangular battery can be made slim without affecting the airtight seal.

When compared to a conventional battery where the electrode terminal is integrally formed with a safety valve, the battery of the present invention has a simpler construction connecting the generator element to the electrode terminal. When the electrode terminal is not integrally formed with a safety valve, fewer parts are required, which simplifies the connection and causes a corresponding reduction in the internal resistance of the battery.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF PREFERRED EMBODIMENTS

1. First Embodiment (A Rectangular Nickel-Hydroxide Battery)

Figure 1:
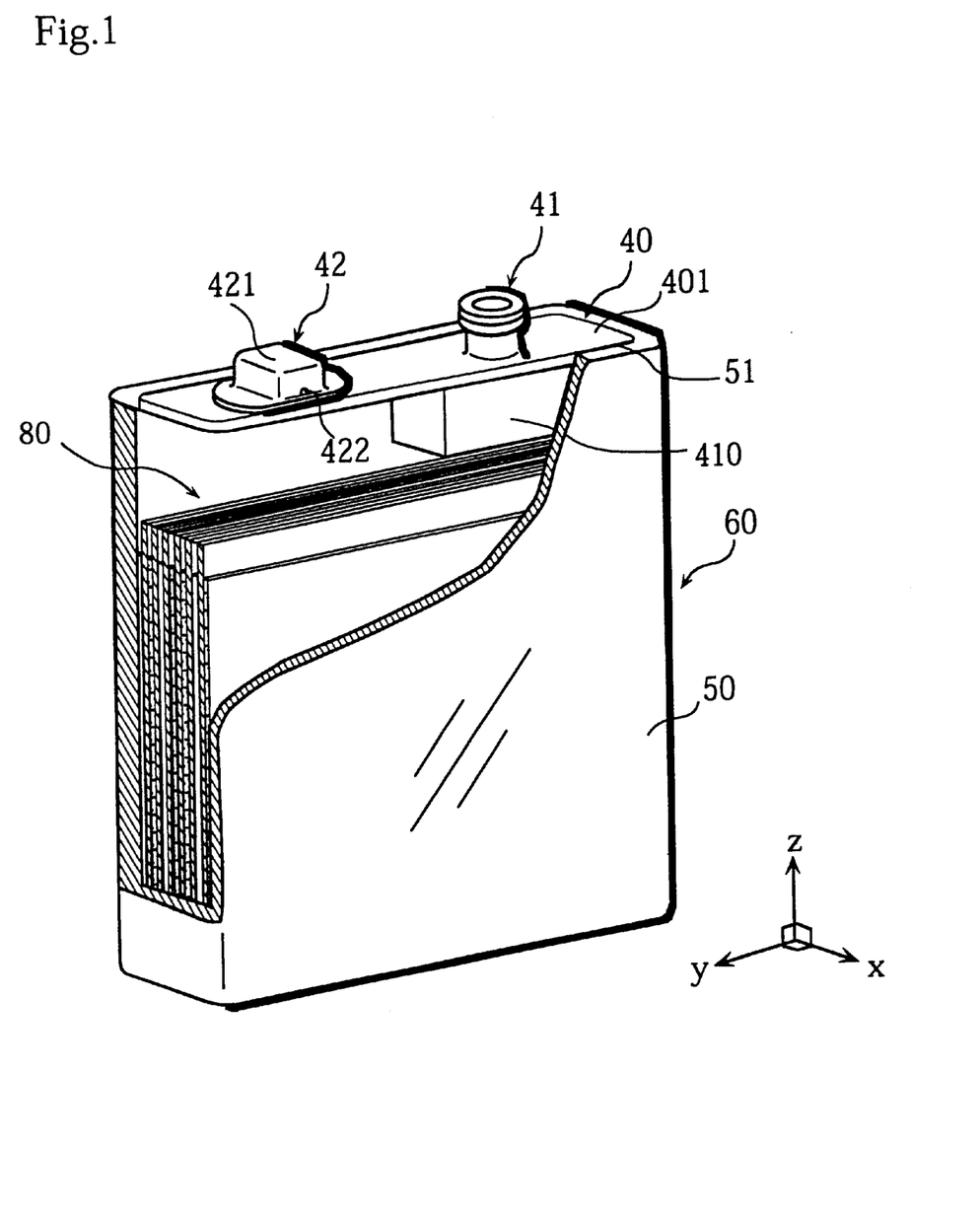
FIG. 1 shows a partial cross-section of a rectangular nickel-hydroxide battery 60 that is a first embodiment of the present invention.

FIG. 1 shows a partial cross-section of a rectangular nickel-hydroxide (Ni—H) battery 60 (hereafter simply "battery 60"). As shown in FIG. 1, the battery 60 has a generator element 80 that is enclosed within an external casing 50. A sealing cap 40 is laser-welded to a rim surrounding an opening 51 of the external casing 50 to seal the battery 60. An electrode terminal (here, a positive electrode terminal) 41 and a safety valve 42 are provided on the upper surface of the sealing cap 40.

1—1 Composition of the Generator Element

Figure 2:
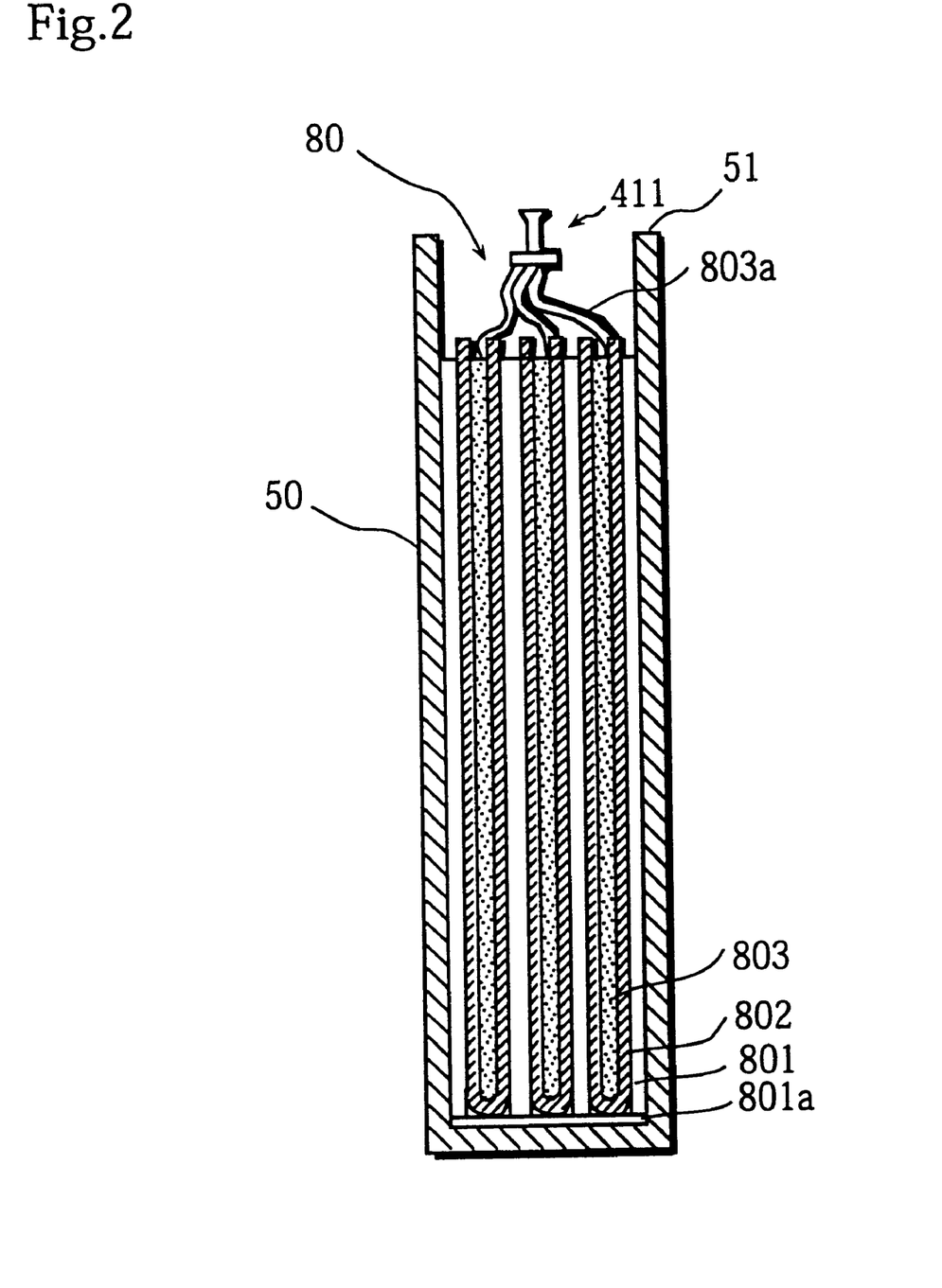
FIG. 2 shows a cross-section of the external casing.

FIG. 2 shows a cross-section of the external casing 50 enclosing the generator element 80, taken across the battery in the thickness direction. As shown in the drawing, the generator element 80 is composed of a plurality of strip-like negative electrode plates 801 and positive electrode plates 803 that are alternately arranged with separators 802 made of an insulating material in-between.

The negative electrode plates 801 are manufactured by binding hydrogen-absorbing alloy powder to both main surfaces of a collector plate made of punching metal using a binding agent such as polyethylene-oxide (PEO). The collector plate is then rolled to a predetermined thickness (such as around 0.5 mm) to form a negative electrode plate 801.

All the negative electrode plates 801 are electrically connected to a tab (negative electrode plate connector) 801a that is composed of a conductive member and is enclosed at the base of the external casing 50. This negative electrode plate connector 801a is in turn electrically connected to the external casing 50. As a result, the external casing 50 becomes charged with a negative polarity.

The positive electrode plates 803 are manufactured by binding a positive electrode active material (composed of a powder whose main constituent is nickel hydroxide) using a binding agent such as hydroxyprophyl cellulose (HPC). This is used to fill the holes in a three-dimensional nickel porous plate which is rolled to a predetermined thickness (such as around 0.7 mm) to form a positive electrode plate 803.

All of the positive electrode plates 803 are electrically connected to a tab (positive electrode plate connector) 803a near the opening 51 in the external casing 50. This positive electrode connector 803a is composed of a conductive member and is in turn electrically connected to a positive electrode terminal 41 that is described later. Note that FIG.

2 shows the case where the positive electrode plate connector 803a is connected to the terminal rivet 411 of the positive electrode terminal 41.

It is preferable for the surfaces of the positive electrode plate connector 803a to be coated with an insulating member to prevent short circuits from occurring between the positive electrode plate connector 803a and the external casing 50.

The separators 802 are composed of non-woven fabric made with thin polyolefin fiber. These separators 802 are arranged inside the external casing 50 so as to completely cover the positive electrode plates 803 and separate the negative electrode plates 801 and positive electrode plates 803.

The generator element 80 with this construction is enclosed inside the external casing 50 having been impregnated with an alkaline electrolyte such as potassium hydroxide (with a concentration of 30% by weight, for example). The opening 51 in the external casing 50 is then sealed using the sealing cap 40.

1-2 Construction of the Sealing Cap

As shown in FIG. 1, the sealing cap 40 is composed of a sealing plate 401, a positive electrode terminal 41 that protrudes through the sealing plate 401 to the outside of the battery, and a return-type safety valve 42 that is provided separately to the positive electrode terminal 41. This safety valve 42 is welded to the sealing cap 40 and so is charged with the opposite polarity (i.e. negative polarity) to the positive electrode terminal 41.

This first embodiment of the present invention is characterized by (1) having the safety valve 42 provided separately to the electrode terminal (positive electrode terminal 41) that was integrally formed with a safety valve in the related art, and (2) having the safety valve 42 double as the negative electrode terminal.

The outer edge of the sealing cap 40 is laser-welded to the rim of the opening 51 in the external casing 50 to seal the inside of the battery.

Figure 3A:
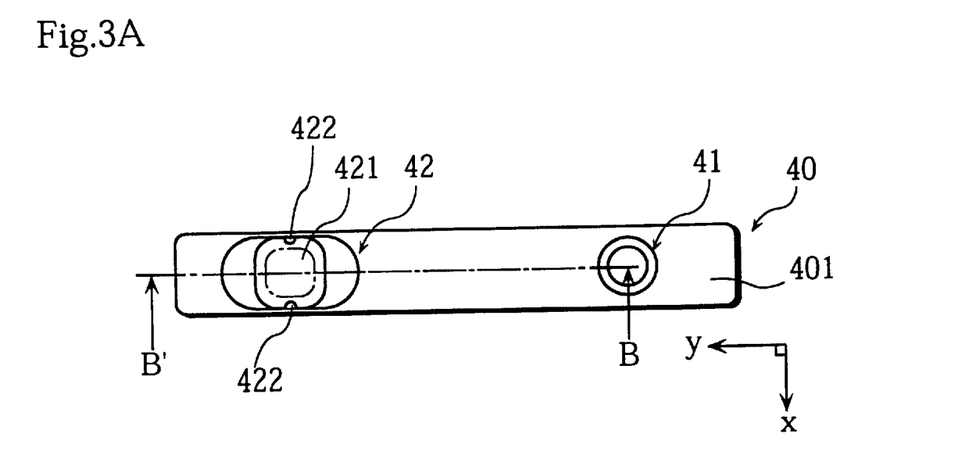
FIGS. 3A to 3C show the construction of the sealing cap, with FIG. 3A showing the sealing cap from above, FIG. 3B showing a partial cross-section, and FIG. 3C showing the sealing cap from below.
Figure 3B:
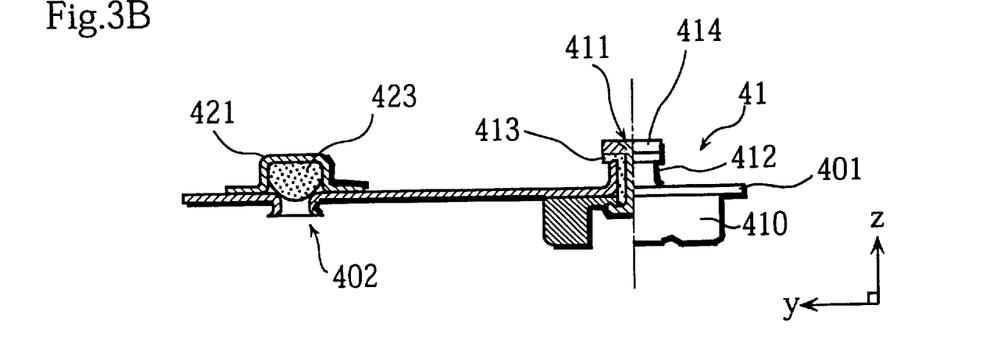
Figure 3C:
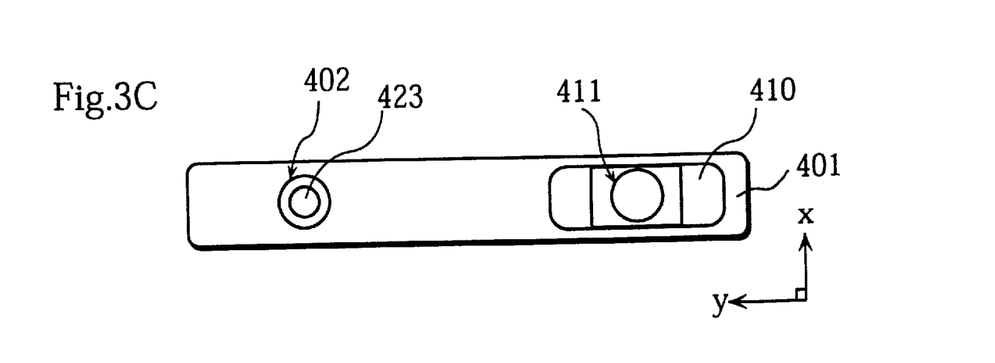

FIGS. 3A to 3C show the sealing cap 40 in more detail. FIG. 3A shows the sealing cap 40 from above. FIG. 3B shows a cross-section taken along the line B–B', and FIG. 3C shows the sealing cap 40 from below.

As shown in FIG. 3B, the safety valve 42 is composed of a valving element 423, which is an elastic body (made of elastic rubber), housed within a valve cap 421. An opening 402 and air outlets 422 are connected to the interior of the battery. Under normal conditions, the valving element 423 presses against the rim of the opening 402 to seal the inside of the battery. As shown in FIG. 3A, the valve cap 421 is directly attached to the sealing plate 401, such as by welding. As a result, the valve cap 421 is charged with the same polarity (negative polarity) as the sealing plate 401 and the external casing 50.

Figure 4:
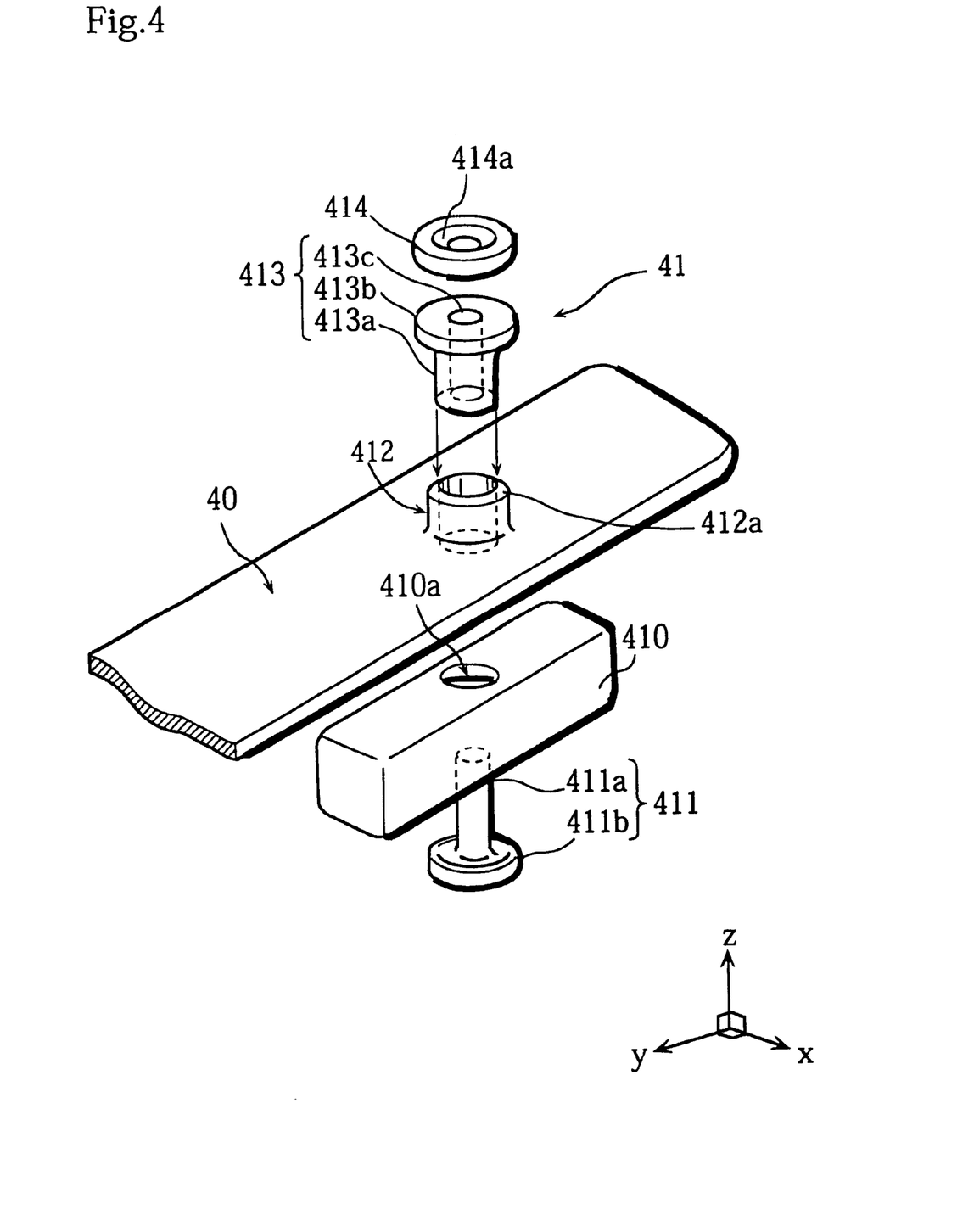
FIG. 4 is an exploded view of the sealing cap.

FIG. 4 is an exploded view of the sealing cap 40 and in particular the positive electrode terminal 41 and surrounding elements. Part of the sealing plate 401 is subjected to a drawing process to produce a cylindrical projection 412 with a hole 412a. A rivet-shaped member (terminal rivet) 411 is inserted into this hole 412a, with a shaft 411a of the terminal rivet 411 fitting into a ring 414. Hole 410a and 413a are respectively provided in the insulator plate 410 and the gasket 413a, with the shaft 411a of the terminal rivet 411 passing through these holes before being attached to the ring 414.

The insulator plate 410 and the gasket 413 are made of a nylon resin, while the other components such as the terminal rivet 411 and the ring 414 are manufactured from nickel-plated steel. Note that the expression "rivet-shaped member" is used here to represent a component that has a cylindrical shaft and a head with a larger diameter than the shaft.

Figure 5:
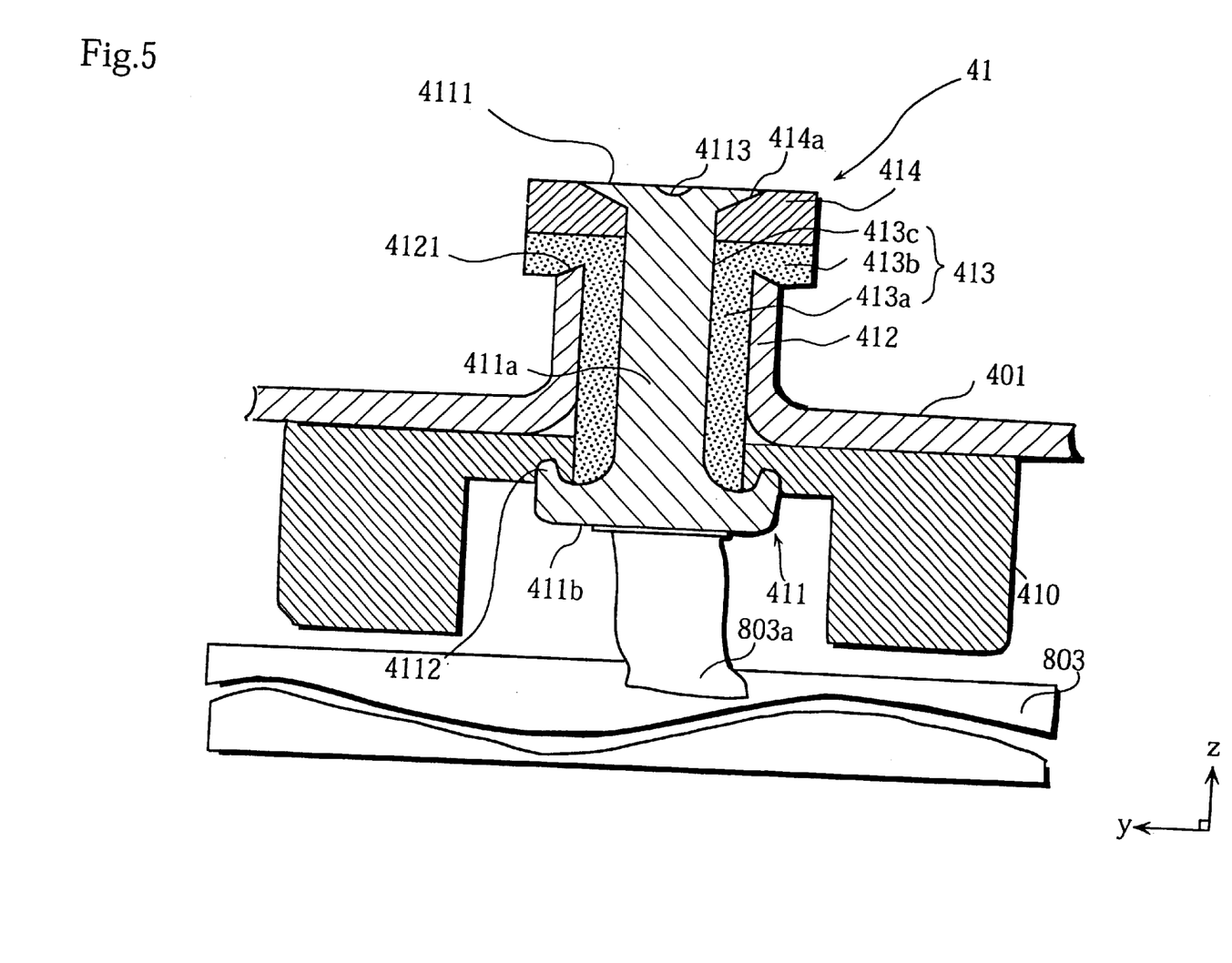
FIG. 5 is an expanded cross-section of the vicinity of the positive electrode terminal.

FIG. 5 is an enlargement of the positive electrode terminal 41 and its vicinity. After the positive electrode terminal 41 has been assembled, the end of the shaft 411a of the terminal rivet 411 is shaped in accordance with the slanted surface 414a of the ring 414 to produce a shaped end 4111 that is connected to the ring 414. This shaped end 4111 is produced by subjecting the end of the shaft 411a of the terminal rivet 411 to a caulking process that attaches the end to the ring 414.

The protrusion 412 is formed in advance so as to have a top edge 4121 whose surface is slanted. During the caulking process, the top edge 4121 digs into the gasket 413 and so forms a favorable airtight seal for the battery. Also, during the caulking process, a hooked part 4112 of the terminal rivet 411 digs into the insulator plate 410 to seal the terminal rivet 411 and the insulator plate 410 in an airtight manner. In FIG. 5, the numeral 4113 indicates the indentation made in the terminal rivet 411 as a result of the caulking process.

The sealing plate 401 is machined so that the thickness of the plate forming the protrusion 412 is less than other parts of the sealing plate 401. This improves the dissipation of heat when the sealing cap 40 and opening 51 are welded together.

Since the positive electrode terminal 41 is formed without an internal safety valve, its construction is far more compact than that of the electrode terminal of the related art that is internally provided with a safety valve.

As shown in FIG. 9, to manufacture an electrode terminal that includes a safety valve as in the related art, the cylindrical member 313 needs to be provided with an internal gas channel that is connected to the inside of the battery. The need to ensure that gas will be able to favorably flow through this channel places a restriction on how small the electrode terminal can be made. With the present invention, however, the safety valve 42 is provided separately to the positive electrode terminal 41 which does not include a safety valve. As a result, the positive electrode terminal 41 has a simpler construction than in the related art.

The insulator plate 410 is used to stop the generator element 80 vibrating within the external casing 50. While externally shaped as a rectangular parallelepiped, the insulator plate 410 has an internal indentation, as shown by the cross-section along the line B–B' that is shown in FIG. 3. This indentation is provided to accept the terminal rivet 411.

FIG. 5 also shows how the head 411b of the terminal rivet 411 is connected to the positive electrode plates 803 via the positive electrode plate connector 803a.

1—3 Effect of the Sealing Cap

As described above, the construction of the terminal rivet 411 and surrounding parts is simpler in the battery of the present embodiment than in the related art example. As a result, the positive electrode terminal 41 can be further miniaturized. As specific data, while a 3.5 mm square terminal was used in the related art, a terminal with a diameter of 3.0 mm or below can be used for the present embodiment.

In the related art, the positive electrode terminal is caulked to the sealing plate 401 on the inside of the battery (see FIG. 9). In the present embodiment, the caulking process is performed at the end of the positive electrode terminal 41. As a result, caulking does not need to be performed inside the battery. The member (the cylindrical member 313 in FIG. 9) that is attached by the caulking process performed in the related art is not needed by the battery of the first embodiment of the present invention. This reduces the required number of components and simplifies the construction of the positive electrode terminal 41 near the sealing plate 401.

Reducing the size of the positive electrode terminal 41 increases the distance between the welded parts of the sealing cap 40 and the positive electrode terminal 41. The parts of the positive electrode terminal 41 (and in particular the resinous parts like the insulator plate 410 and the gasket 413) are therefore relatively unaffected by the heat generated when the edge of the sealing cap 40 is laser-welded to the opening 51. This is especially effective when, like the battery 60, a battery has a metal case (i.e., the external casing 50 and sealing plate 401) and the resinous parts provided near the positive electrode terminal 41 are susceptible to damage through heat.

Since the positive electrode terminal 41 of the first embodiment can be made smaller than in the related art, less space is taken up within the battery by the parts provided near the sealing plate 401. As a result, the head 411b of the terminal rivet 411 can be made flat and can be connected to the positive electrode plate connector 803a. In this construction, the positive electrode terminal 41 can be directly connected to the positive electrode plates 803 using only the positive electrode plate connector 803a. This means that a further decrease is possible in the number of components, which achieves a corresponding reduction in the internal resistance of the battery. This effect is described in more detail later in this specification.

When the positive electrode terminal 41 and the safety valve 42 are made smaller in this way, the battery 60 can be made slimmer while still having a favorable airtight seal. This means that batteries of superior performance can be manufactured.

Since the valve cap 421 of the safety valve 42 is directly attached to the sealing plate 401, the safety valve 42 can be used as the negative electrode terminal. As a result, the battery 60 has electrode terminals for both polarities arranged on the sealing cap 40. This makes it easy to connect neighboring batteries when a plurality of batteries are arranged with the same orientation, thereby facilitating use of the battery 60 in multiple battery packs. In this way, the battery 60 can be made slimmer than conventional batteries with no loss in performance.

2. Manufacturing the Battery
2-1 Manufacturing the External Casing

As one example, the external casing 50 can be manufactured by deep drawing nickel-plated sheet steel (with a thickness of 0.45 mm) using a stamping mould. This battery 60 can be made slimmer than the related art example shown in FIG. 5, so that example dimensions for the external casing 50 are 35.0 mm high, 26 mm wide and 4.2 mm thick for a casing made of plate that is around 0.4 mm thick. Due to the effects of the sealing cap 40 described above in section 1–3, the thickness of the external casing 50 can be reduced to 6.0 mm or below. This first embodiment of the present invention is therefore especially effective when making slim batteries whose thickness is 6.0 mm or below.

2-2 Manufacturing the Sealing Cap

The sealing plate 401 of the sealing cap 40 can be made by stamping a predetermined shape out of nickel-plated sheet steel using a stamping mould. The projection 412 is then formed by a deep drawing process. As one example, assume that the deep drawing process produces a projection 412 that is around 1 mm high (measured from the surface of the sealing plate 401) and that the thickness of the plate forming the projection 412 is 0.2 mm. If the projection 412 is at least 1 mm high, the heat produced during the laser welding performed to seal the battery 60 will not be transmitted to the gasket 413, thereby solving the problem of the gasket 413 being deformed by this heat.

Note that the top edge of the projection 412 can be ground to produce a slanting face that makes the end of the projection 412 sharp.

After forming the sealing plate 401 is this way, a terminal rivet 411 made of nickel-plated steel is threaded through the hole 412a in the projection 412 via a resinous gasket 413 and an insulator plate 410 and is attached to a ring 414 (also made of nickel-plated steel) by a caulking process that reshapes the end of the terminal rivet 411. This completes the construction of the positive electrode terminal 41.

Following this, a valving element 423 that is a sphere (with a diameter of 2.1 mm) of elastic rubber, such as ethylene propylene diene monomer (EPDM), is inserted. A valve cap 421, which is square-shaped with sides of around 3 mm and is made of nickel-plated steel, is attached to the sealing plate 401 so as to cover the valving element 423 with the valving element 423 pressing against the vent hole 402 in the sealing plate 401. This forms a safety valve 42 that doubles as the negative electrode terminal.

This completes the manufacturing of the sealing cap 40.

2-3 Manufacturing of the Generator Element

Positive electrode plates 803 are formed by coating punching metal formed of nickel-plated sheet steel with a positive electrode active material that has nickel hydroxide as its main constituent. Negative electrode plates 801 are formed by coating the same punching metal with a hydrogen-absorbing alloy.

The electrode plates are alternately stacked with separators 802 formed of porous sheets of nylon resin in-between to form the generator element 80. A tab (the positive electrode plate connector) 803a is connected to the punching metal of each positive electrode plate 803 to electrically connect all of the positive electrode plates 803. At the base of the generator element 80, a tab (the negative electrode plate connector) 801a is also connected to the punching metal of each negative electrode plate 801 to electrically connect all of the negative electrode plates 801.

This first embodiment has a construction where the external casing 50 is charged with negative polarity. This means that a negative electrode plate 801 (i.e. a plate with the opposite polarity to the electrode terminal) or separator 802 may be positioned on the outer main surfaces of the generator element 80. When a negative electrode plate 801 is positioned on the outer main surface of the generator element 80, the negative electrode plate 801 will directly contact the external casing 50, so that a negative electrode plate connector 801a may not need to be provided.

2-4 Completion of the Battery

The generator element 80 manufactured as described above is inserted into the external casing 50. The tab (positive electrode plate connector) 803a that extends from the positive electrode plates 803 is then connected to the head 411b of the terminal rivet 411 of the positive electrode terminal 41, such as by spot welding. In the same way, the tab (the negative electrode plate connector) 801a that extends from the negative electrode plates 801 is connected to the external casing 50.

Note that the tab (positive electrode plate connector) 803a may be connected to the head 411b of the terminal rivet 411 before the terminal rivet 411 is set in the projection 412 in the sealing cap 40. Connecting the positive electrode plates 803 to the head 411b of the terminal rivet 411 beforehand in this way makes it easier to connect the generator element 80 and the sealing cap 40 during manufacturing.

This is also one characteristic of the first embodiment. In a sealed rectangular battery of the related art, the positive electrode terminal is attached to the sealing plate by caulking on the inside of the battery. When the positive electrode terminal is attached to the sealing cap after the positive electrode plate connector has been connected to the positive electrode terminal, caulking is performed near this connection and carries the risk of breaking the connection between the positive electrode plate connector and the positive electrode terminal.

On the other hand, the first embodiment of the present invention is assembled by performing caulking on the outside of the battery 60. A favorable connection can therefore be maintained between the positive electrode plate connector 803a and the terminal rivet 411, so that disconnections do not occur. Battery manufacturers are therefore free to choose whether to connect the tab (positive electrode plate connector) 803a to the head 411b of the terminal rivet before or after the terminal rivet 411 is set in the projection 412 of the sealing cap 40.

After the generator element has been inserted into the external casing 50, an electrolyte that is a 30 wt % aqueous solution of potassium hydroxide (KOH) is introduced into the external casing 50. The sealing cap 40 is then placed over the opening in the external casing 50 and is laser-welded to the rim of the opening 51 to seal the battery 60.

This completes the manufacturing process for the rectangular nickel-hydroxide battery 60.

2-5 Internal Resistance of the Battery

Conventionally, the positive electrode plate connector is not connected directly to the positive electrode terminal, but is instead connected via a separate conducting member. This conducting member is one component of the electrode terminal that internally includes a safety valve (see FIGS. 8 and 9), and corresponds to the positive electrode collector 303 in the example illustrated in FIG. 8. Using a conducting member in this way tends to increase the internal resistance of the battery.

The first embodiment of the present invention has the safety valve 42 provided separately from the positive electrode terminal 41. This results in a simpler structure than the related art where these elements are combined, and makes it easier to electrically connect the generator element to the electrode terminal. This is because this connection can be made with fewer parts.

The simplification of the connecting structure has a further effect in that the internal resistance of the battery is reduced by an amount equivalent the resistance of the parts removed from the construction. In more detail, the first embodiment of the present invention has the tab (positive electrode plate connector 803a) directly connected to the head 411b of the terminal rivet 411. As a result, no unnecessary components are positioned between the positive electrode plates 803 and the positive electrode terminal 41. This means that the internal resistance of the battery can be made lower than was conventionally possible.

3. Experiment

A battery was made according to the first embodiment of the present invention, and discharge efficiency during high-rate discharge and internal resistance were measured. A battery with the construction shown in FIG. 8 was also manufactured as a comparative example. This comparative example was also subjected to the same measurements of discharge efficiency during high-rate discharge and internal resistance.

The measurements of internal resistance were taken using an AC current with a frequency of 1kHz.

The high-rate discharge efficiency was measured by charging each battery for sixteen hours with a capacitance of 0.1 C, leaving the batteries for one hour, and then discharging the batteries at 2.0 C with an ending voltage of 1.0 V. This was then repeated with the batteries being discharged at 4.0 C, again with an ending voltage of 1.0 V.

The results of these measurements are shown in the tables below. Table 1 shows the measurements of internal resistance, and Table 2 shows the measurements for discharge efficiency. The measurements of internal resistance where taken for a sample batch of thirty (N=30) batteries that were manufactured in the same way. Conversely, the measurements of discharge resistance where taken for a sample batch of ten (N=10) batteries that were manufactured in the same way. The values given in Tables 1 and 2 show the averages of the measurements, while the ranges shown below these averages give the ranges of the measurements.

TABLE 1

| N = 30 | Comparative Example | Embodiment |
|---|---|---|
| Internal Resistance | 27.4 mΩ<br>24.8~29.5 | 21.3 mΩ<br>17.7~22.4 |

TABLE 2

|  | Comparative Example | Embodiment |
|---|---|---|
| 2C | 90.2%<br>90.0~90.5 | 93.1%<br>92.7~93.7 |
| 4C | 82.7%<br>80.4~85.2 | 86.4%<br>84.5~88.4 |

As shown in Table 1, the battery of the present embodiment has a lower internal resistance than the comparative example. It is believed that this effect is due to the positive electrode plates 803 being directly connected to the positive electrode terminal 41 by the positive electrode plate connector 803a so that power is supplied with a lower internal drop in power than in the comparative example.

From Table 2, it can be seen that the battery of this first embodiment also has superior discharge characteristics. Note that discharge characteristics improve in keeping with decreases in internal resistance.

4. Second Embodiment

Figure 6A:
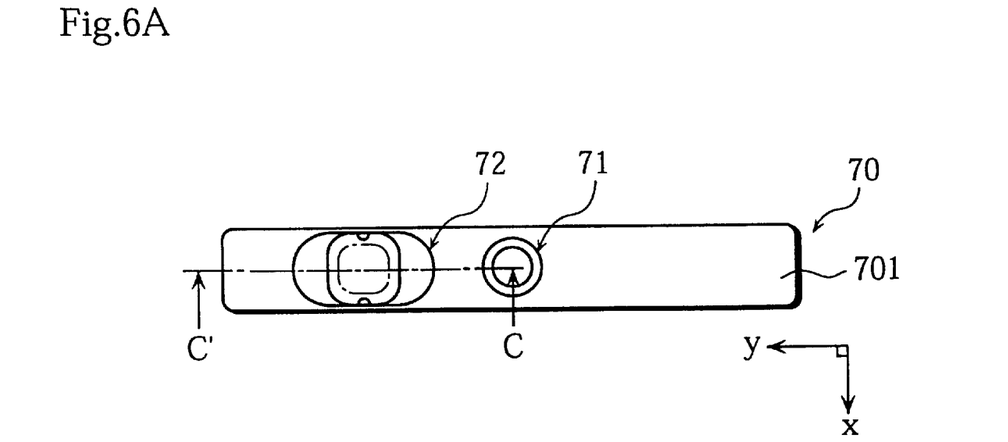
FIGS. 6A to 6C show the construction of the sealing cap in the second embodiment of the present invention, with FIG. 6A showing the sealing cap from above, FIG. 6B showing a partial cross-section, and FIG. 6C showing the sealing cap from below.
Figure 6B:
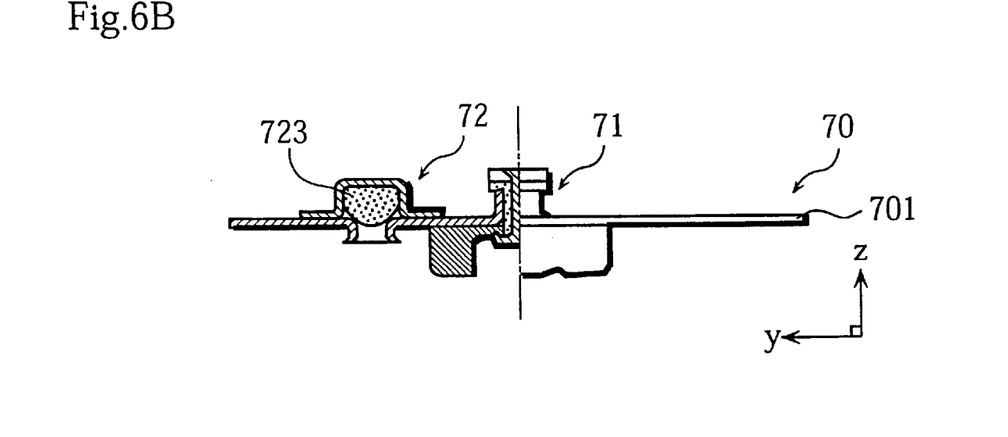
Figure 6C:
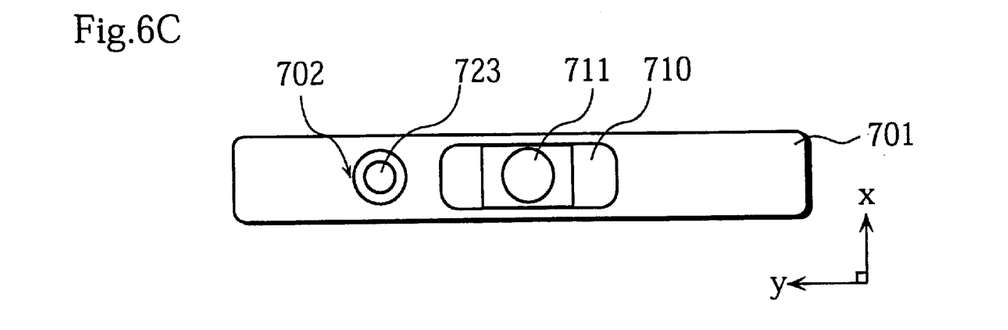

FIGS. 6A to 6C show the construction of a sealing cap 70 for a rectangular nickel hydroxide battery that is a second embodiment of the present invention. As can be seen from FIGS. 6A to 6C, the second embodiment differs from the first embodiment in that the positive electrode terminal 71 is arranged in the center of the sealing plate 701. As a result, the insulator plate 710 and terminal rivet 711 are positioned in the center of the underside of the sealing plate 701. The safety valve 72 that houses the valving element 723 is positioned in the same way as the safety valve 42. This construction has the same effects as the first embodiment. The ability to adapt the battery in this way is thought to be especially helpful when designing batteries for different purposes.

In the present invention, the positive electrode terminal and the safety valve may be arranged on the main surface of the sealing plate at different distances from the center of the sealing plate.

5. Third Embodiment

Figure 7:
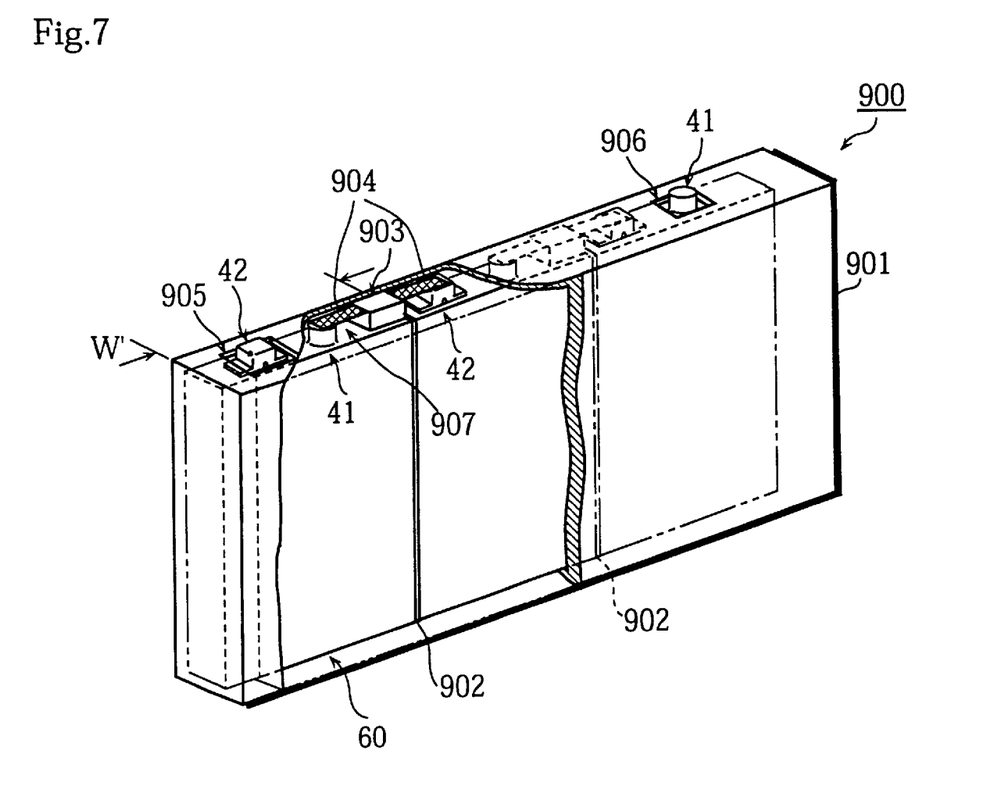
FIG. 7 shows a partial cross-section of a battery pack which is a third embodiment of the present invention.

FIG. 7 is a perspective drawing showing the overall construction of a battery pack (combined battery) 900 that includes a plurality of batteries 60 according to the first embodiment of the present invention.

The battery pack 900 has an insulating frame 901 in which a plurality (three in the illustrated example) of batteries 60 are inserted. This makes it possible to use the plurality of batteries as a single battery. The batteries 60 are arranged inside the frame 901 in the direction shown as W' in FIG. 7, which is to say, with their narrowest sides together and the safety valves 42 and positive electrode terminal 41 arranged in a straight line. To prevent short circuits between adjacent external casings 50, insulating sheets 902 are placed between adjacent batteries 60 in the frame 901.

Adjacent safety valves 42 and positive electrode terminals 41 are connected to one another using connectors 904 that pass through breakers 903. These breakers 903 are arranged into the spaces 907 between the safety valves 42 and positive electrode terminals 41. The safety valve 42 and positive electrode terminal 41 that are respectively positioned at each end of the battery pack 900 protrude through the terminal holes 905 and 906 formed in the frame 901. The protruding safety valve 42 and positive electrode terminal 41 are used as the external terminals of the battery pack 900, and so can be connected to an external load.

The breakers 903 are a well-known component and function so as to break the flow of electricity between adjacent batteries when the current is equal to or greater than a threshold value.

The battery pack 900 described above has the following effects.

Each single battery 60 in the battery pack 900 has a positive electrode terminal 41 and a safety valve 42 (negative electrode terminal) provided separately on the sealing cap 40 of the battery 60, as explained in the first embodiment. When these batteries 60 are arranged into the frame 901, adjacent batteries 60 can be connected by relatively short connectors. This decreases the internal resistance of the battery pack 900.

All of the batteries 60 are arranged with the same orientation within the battery pack 900. This makes it easy to connect the batteries 60 when manufacturing the battery pack 900.

Inside the battery pack 900, the breakers 903 can be provided in spaces 907 that exist above pairs of adjacent batteries. This makes the battery pack 900 compact.

6. Other Considerations

The first embodiment describes an example construction where the safety valve is separated from the positive electrode terminal on the sealing cap and caulking is performed for the positive electrode terminal on the outside of the battery. However, caulking is not necessary for the present invention, so that the terminal rivet and ring may be connected by spot welding, for example.

In the embodiments, the electrode terminal provided on the sealing cap is described as being the positive electrode terminal with the safety valve and external casing being charged with negative polarity. These polarities can be reversed, however.

In the described embodiments, the head of the terminal rivet is described as being a separate component to the positive electrode plate connector, although these parts may be integrally formed. When this is the case, it is no longer necessary to connect the terminal rivet to the positive electrode plate connector. This facilitates the manufacturing of the battery and may also reduce the internal resistance of the battery.

The embodiments describe the case where a safety valve and a positive electrode terminal are provided on the sealing cap, though these components may be provided anywhere on the case (i.e., the external casing and sealing cap) of the battery. As one example, the safety valve and a positive electrode terminal may be provided separately on the side of the external casing.

While the present invention is described in terms of embodiments that relate to nickel hydroxide batteries, the invention may also be applied to other types of sealed rectangular batteries.

Finally, while the embodiments describe the case where the sealing cap is attached to the rim of the opening in the external casing by laser welding, other methods, such as an electron beam, may be used.

Although the present invention has been fully described by way of examples with reference to the accompanying drawings, it is to be noted that various changes and modifications will be apparent to those skilled in the art. Therefore, unless such changes and modifications depart from the scope of the present invention, they should be constructed as being included therein.

What is claimed is:

1. A sealed rectangular battery having an electrically conductive battery case made up of (1) an external casing that has an opening and (2) a sealing cap that is attached using heat to the external casing to seal the opening, the sealed rectangular battery comprising:
    an electrode terminal having a shaft member that (1) protrudes through a first hole formed in the battery case and (2) is insulated from the battery case with an insulating gasket;
    and a safety valve composed of (i) a valving element that covers a second hole which is connected to an inside of the sealed rectangular battery, and (ii) a cap that houses the valving element and becomes charged with a same polarity as the battery case, wherein
    the electrode terminal and the safety valve are provided separately at different positions on the battery case,
    the first hole has a cylindrical projection formed in the battery case to project in a direction outward from the battery case, and
    an exposed part of the gasket is positioned at an outward top edge of the projection.

2. A sealed rectangular battery according to claim 1, wherein the sealed rectangular battery is an alkaline storage battery.

3. A sealed rectangular battery according to claim 1, wherein the safety valve is a return-type safety valve and the valving element is made of an elastic material.

4. A sealed rectangular battery according to claim 1, wherein the external casing and the sealing cap are made of metal and the sealing cap is attached to the external casing by laser welding.

5. A sealed rectangular battery according to claim 4, wherein the electrode terminal and the safety valve are provided on a main surface of the sealing cap.

6. A sealed rectangular battery according to claim 5, wherein the electrode terminal and the safety valve are positioned at different distances from a center of the main surface of the sealing cap.

7. A sealed rectangular battery according to claim 1, wherein the electrode terminal and the safety valve are different shapes.

8. A sealed rectangular battery according to claim 1, wherein the battery case is no thicker than six millimeters.

9. A sealed rectangular battery according to claim 1, wherein the shaft is attached to the projection by caulking the shaft at a top of the projection.

10. A sealed rectangular battery according to claim 1, wherein the shaft has a flattened end so as to extend outwardly beyond the sides of the shaft and the sealed rectangular battery further comprises:

a generator element that includes at least one first member having a first polarity, at least one second member having a second polarity, and at least one separator that is inserted between each first member and second member, the generator element being impregnated with electrolyte; and a connecting member for connecting the flattened end of the shaft to the at least one first member.

11. A sealed rectangular battery having an electrically conductive battery case made up of (1) an external casing that has an opening and (2) a sealing cap that is attached using heat to the external casing to seal the opening, the sealed rectangular battery comprising:

an electrode terminal having a shaft member that (1) protrudes through a first hole formed in the battery case and (2) is insulated from the battery case; and a safety valve composed of (i) a valving element that covers a second hole which is connected to an inside of the sealed rectangular battery, and (ii) a cap that houses the valving element and becomes charged with a same polarity as the battery case, wherein the electrode terminal and the safety valve are provided separately at different positions on the battery case, a cylindrical outward projection with the first hole is formed in the battery case, the sealed rectangular battery further comprises an insulating gasket, the shaft member of the electrical terminal protrudes through the first hole in the projection and is insulated from the battery case by the gasket, and a top edge of the projection is sharp and the sealing cap and the shaft are sealed together with the top edge of the projection digging into the gasket.

12. A sealed rectangular battery having an electrically conductive battery case made up of (1) an external casing that has an opening and (2) a sealing cap that is attached using heat to the external casing to seal the opening, the sealed rectangular battery comprising:

an electrode terminal having a shaft member that (1) protrudes through a first hole formed in the battery case and (2) is insulated from the battery case; and a safety valve composed of (i) a valving element that covers a second hole which is connected to an inside of the sealed rectangular battery, and (ii) a cap that houses the valving element and becomes charged with a same polarity as the battery case, wherein the electrode terminal and the safety valve are provided separately at different positions on the battery case, a cylindrical outward projection with the first hole is formed in the battery case, the sealed rectangular battery further comprises an insulating gasket, the shaft member of the electrical terminal protrudes through the first hole in the projection and is insulated from the battery case by the gasket, and the projection is formed in a main surface of the sealing cap and has a height of at least one millimeter measured from the main surface.

13. A sealed rectangular battery having an electrically conductive battery case made up of (1) an external casing that has an opening and (2) a sealing cap that is attached using heat to the external casing to seal the opening, the sealed rectangular battery comprising:

an electrode terminal having a shaft member that (1) protrudes through a first hole formed in the battery case and (2) is insulated from the battery case; and a safety valve composed of (i) a valving element that covers a second hole which is connect to an inside of the sealed rectangular battery, and (ii) a cap that houses the valving element and becomes charged with a same polarity as the battery case, wherein the electrode terminal and the safety valve are provided separately at different positions on the battery case, a cylindrical outward projection with the first hole is formed in the battery case, the sealed rectangular battery further comprises an insulating gasket, the shaft member of the electrical terminal protrudes through the first hole in the projection and is insulated from the battery case by the gasket, and the projection is formed in a main surface of the sealing cap and a thickness of a material forming the sealing cap is thinner at the projection than at other parts of the sealing cap.

14. A sealed rectangular battery having an electrically conductive battery case made up of (1) an external casing that has an opening and (2) a sealing cap that is attached using heat to the external casing to seal the opening, the sealed rectangular battery comprising:

an electrode terminal having a shaft member that (1) protrudes through a first hole formed in the battery case and (2) is insulated from the battery case;

a safety valve composed of (i) a valving element that covers a second hole which is connected to an inside of the sealed rectangular battery, and (ii) a cap that houses the valving element and becomes charged with a same polarity as the battery case, an insulating gasket, and an insulation plate that is positioned inside the sealed rectangular battery, wherein the electrode terminal and the safety valve are provided separately at different positions on the battery case, a cylindrical outward projection with the first hole is formed in the battery case, the shaft member of the electrical terminal protrudes through the first hole in the projection and is insulated from the battery case by the gasket, and the shaft is a rivet-shaped member that has a head with a hook-shaped part on an inside of the sealed rectangular battery, the shaft passing through the insulation plate and being attached to the projection so that the hook-shaped part digs into the insulation plate.

* * * * *